United States Patent [19]  [11] Patent Number: 4,666,349
Altmeyer et al.  [45] Date of Patent: May 19, 1987

[54] MATERIAL REMOVING TOOL

[75] Inventors: Werner Altmeyer, Völklingen; Ewald Jakobs, Schwalbach-Bous; Berthold Scheer, Wallerfangen, all of Fed. Rep. of Germany

[73] Assignee: TechnoARBED Deutschland GmbH, Saarbrücken, Fed. Rep. of Germany

[21] Appl. No.: 892,136

[22] Filed: Jul. 30, 1986

[30] Foreign Application Priority Data

Aug. 1, 1985 [DE] Fed. Rep. of Germany ....... 3527544

[51] Int. Cl.$^4$ .............................................. B23B 27/14
[52] U.S. Cl. .................................. 407/118; 76/101 R; 76/DIG. 10; 219/77; 228/122; 228/144
[58] Field of Search ............ 407/118, 119; 76/101 R, 76/101 A, DIG. 10; 29/412, 413, 418, 447; 228/122, 144; 219/77

[56] References Cited

U.S. PATENT DOCUMENTS 2,888,247  5/1959  Haglund ............................... 407/118
2,944,323  7/1960  Stadler ................................. 407/118
3,800,380  4/1974  Cline et al. ........................... 407/118
4,561,810  12/1985  Ohno ................................... 76/101 R

FOREIGN PATENT DOCUMENTS 9315   4/1980  European Pat. Off. .......... 76/101 R
19461  11/1980  European Pat. Off. ............ 407/119

Primary Examiner—Nicholas P. Godici
Assistant Examiner—Jerry Kearns
Attorney, Agent, or Firm—Peter K. Kontler

[57] ABSTRACT

A material removing tool wherein a substantially plate-like support of steel carries at least one annular cutter which is made of a harder metallic material capable of being soldered to the material of the support. The support has a centrally extending projection which is received in a complementary opening of the cutter, and the cutter has two or more substantially radially extending webs in register with grooves which weaken the cutter in the regions of the webs so that at least one of the webs breaks in response to soldering of the cutter to the support. The breaking of one or more webs is promoted by proper selection of the thermal expansion coefficients of the materials of the support and cutter. The provision of breaks in the webs, either as a result of bonding or as a result of utilization of cutter sections, ensures that each cutter section between two neighboring webs can be put to use independently of the condition of the other section or sections.

20 Claims, 22 Drawing Figures

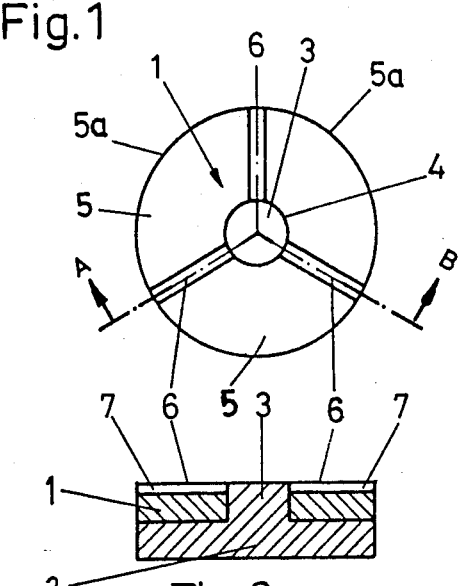
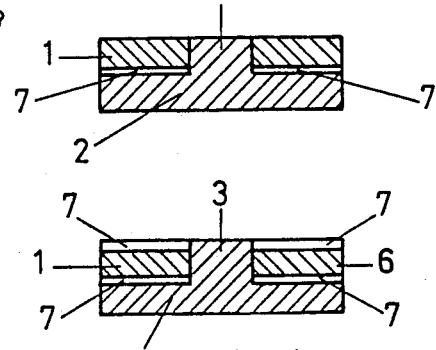
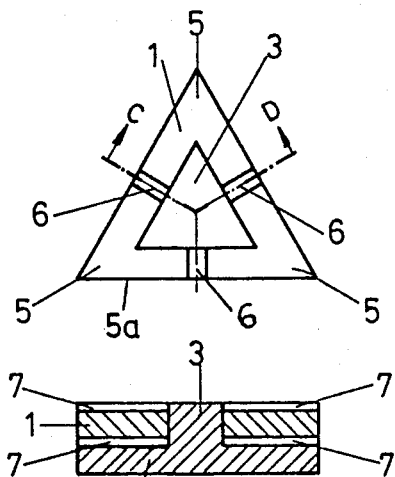
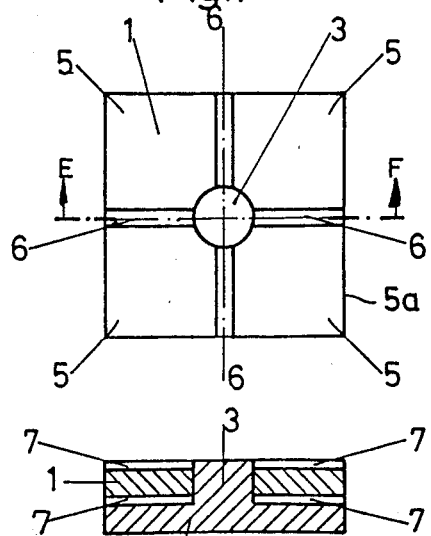

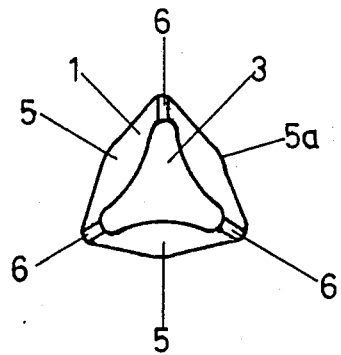
Fig. 9
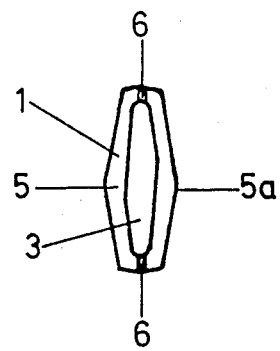
Fig. 10
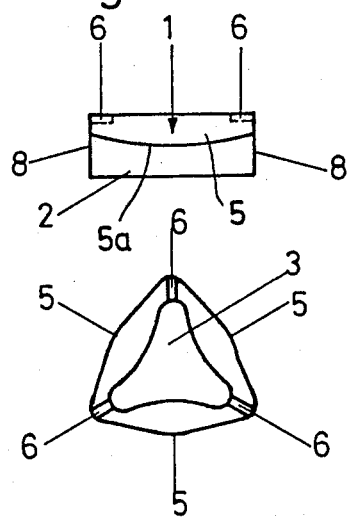
Fig. 11
Fig. 12
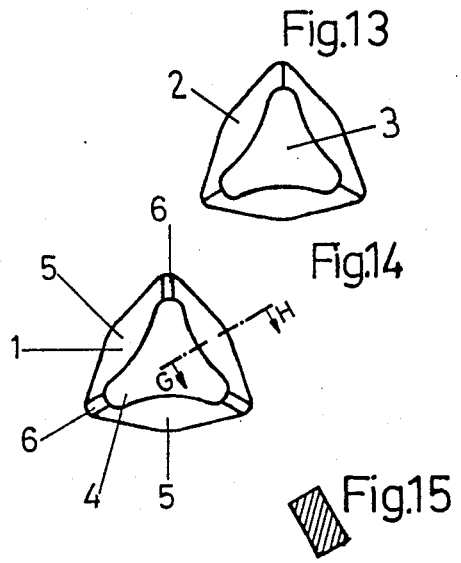
Fig. 13
Fig. 14
Fig. 15

U.S. Patent May 19, 1987 Sheet 3 of 3 4,666,349
Fig. 16
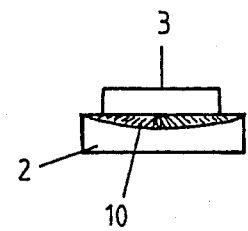
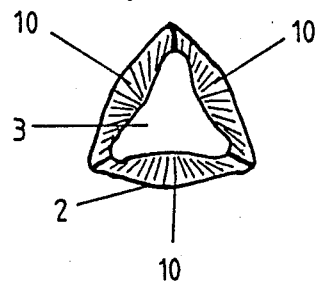
Fig. 17
Fig. 18
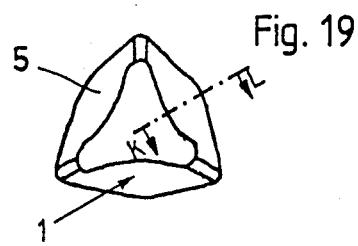
Fig. 19
Fig. 20
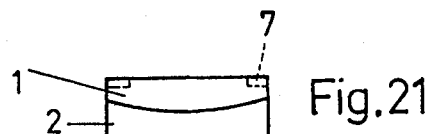
Fig. 21
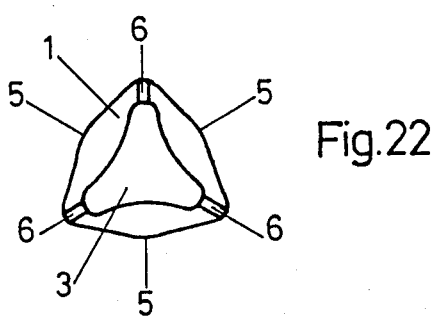
Fig. 22

MATERIAL REMOVING TOOL

BACKGROUND OF THE INVENTION

The present invention relates to material removing tools, particularly to tools which can be used with advantage to remove material from metallic workpieces. Still more particularly, the invention relates to improvements in material removing tools of the type wherein a metallic support is connected with a cutter having several cutting edges.

German Pat. No. 1 800 195 discloses a material removing tool wherein the support is made of steel and the cutter consists of a harder metallic material. The cutter has four cutting edges and the tool is designed to be mounted in a number of different positions in each of which a different cutting edge can remove material from workpieces. A drawback of the patented tool is that, if the cutter develops a crack, the entire tool must be discarded even though one or more cutting edges are still capable of removing material from workpieces.

British Pat. No. 1,493,028 discloses a modified material removing tool wherein a support of hard and tough steel carries several strip-shaped cutters made of hard metal or a ceramic material. The cutter is disposed at one side of the support and exhibits only two cutting edges. A drawback of this tool is that it must be discarded after a relatively short period of use due to the fact that it comprises only two cutting edges. Furthermore, the application of strips to the material of the support presents serious problems. As a rule, the application involves soldering of the harder material to the support.

German patent application No. P 34 33 184.0-14 discloses a further material removing tool wherein a plate-like support has a substantially Z-shaped cutout for a substantially Z-shaped insert of hard material which is capable of removing metal from workpieces. The insert extends beyond both sides of the support so that it provides two pairs of cutting edges. A drawback of such material removing tools is their high cost.

OBJECTS AND SUMMARY OF THE INVENTION

An object of the invention is to provide a novel and improved material removing tool which can stand a substantial number of repeated uses and can be made at a cost which is a fraction of the cost of heretofore known material removing tools.

Another object of the invention is to provide a material removing tool which can be reused even if one of its cutting sections is destroyed.

A further object of the invention is to provide a material removing tool wherein the presence of one or more cracks or fissures in the cutter does not prevent the tool from continuing to remove material from workpieces.

Still another object of the invention is to provide a novel and improved method of assembling the support and the cutter of the above outlined material removing tool.

An additional object of the invention is to provide a material removing tool which can be used in conventional machine tools and the like and whose useful life is longer than that of conventional material removing tools.

A further object of the invention is to provide a material removing tool which can be formed with any desired practical number of discrete cutting edges.

One feature of the invention resides in the provision of a material removing tool which comprises a support consisting of a first material (such as steel) having a first thermal expansion coefficient, and a composite cutter which consists of a harder second material (such as tungsten carbide) having a different second thermal expansion coefficient and being bondable to the first material. The cutter includes a plurality of neighboring sections each of which has a cutting edge, and webs which are disposed between the sections and have cross-sectional areas smaller than the cross-sectional areas of the sections. The cutter is bonded to the support as a result of the application of heat at temperatures which are sufficiently high to ensure that at least one of the webs exhibits cracks due to the difference between the thermal expansion coefficients of the materials of the support and cutter and due to the difference between the cross-sectional areas of the sections of the webs. The cutter preferably constitutes an annulus, and the support is preferably provided with a substantially centrally located projection which is surrounded by the annulus.

The support can comprise a relatively thin portion adjacent each of the cutting edges, and each section of the cutter can be provided with a relatively thick portion in the region of the respective cutting edge. The thickness of the support can decrease in a direction radially outwardly from the projection, and the support and the cutter can be provided with abutting surfaces which are bonded to each other.

In accordance with a presently preferred embodiment of the invention, the cutter has recesses (for example, in the form of grooves or notches) which are in register with the webs. Thus, each web can be said to constitute a weakened portion of the cutter. The recesses can be provided in that side or surface of the cutter which faces toward and is bonded to the support, in that side or surface of the cutter which faces away from the support, or in each such side or surface of the cutter.

The cutter can have a substantially circular shape or a substantially polygonal shape (for example, a substantially triangular, square, hexagonal or octagonal shape).

In accordance with a further embodiment of the invention, the material removing tool can comprise two identical or dissimilar cutters disposed at the opposite sides of a substantially plate-like support of steel or another metallic material which can be soldered or similarly bonded to the material of the cutters.

Another feature of the invention resides in the provision of a method of assembling a material removing tool. The method comprises the steps of forming a support which consists of a first material having a first thermal expansion coefficient, forming a cutter which consists of a harder second material which can be bonded to the material of the support and has a different second thermal expansion coefficient, providing the cutter with a plurality of cutting edges and with weakened portions intermediate the cutting edges, and bonding the cutter to the support with the application of heat at a temperature which is high enough to ensure that the integrity of at least one of the weakened portions is destroyed due to the difference between the thermal expansion coefficients of the materials of the support and the cutter. The bonding step preferably includes soldering the cutter to the support. The method can further comprise the steps of providing the cutter with a substantially centrally located opening, providing the support with a projection and assembling the support and the cutter in such a way that the projection is received in the opening of the cutter. The first material is or can be steel. Each weakened zone of the cutter is preferably formed by reducing the cross-sectional area of the cutter between its cutting edges.

The novel features which are considered as characteristic of the invention are set forth in particular in the appended claims. The improved material removing tool itself, however, both as to its construction and the mode of assembling the same, together with additional features and advantages thereof, will be best understood upon perusal of the following detailed description of certain specific embodiments with reference to the accompanying drawing.

BRIEF DESCRIPTION OF THE DRAWING

FIG. 1 is a schematic plan view of a material removing tool which embodies one form of the invention;

FIG. 2 is a sectional view as seen in the direction of arrows from the line A-B in FIG. 1;

FIG. 3 is a similar sectional view of a modified material removing tool;

FIG. 4 is a similar sectional view of a further material removing tool;

FIG. 5 is a plan view of a further material removing tool having a triangular outline;

FIG. 6 is a sectional view as seen in the direction of arrows from the line C-D in FIG. 5;

FIG. 7 is a plan view of a material removing tool having a substantially square outline;

FIG. 8 is a sectional view as seen in the direction of arrows from the line E-F of FIG. 7;

FIG. 9 is a plan view of a material removing tool having a substantially hexagonal outline;

FIG. 10 is a plan view of a further material removing tool;

FIG. 11 is a side elevational view of an additional material removing tool having a substantially hexagonal outline;

FIG. 12 is a plan view of the tool which is shown in FIG. 11;

FIG. 13 is a plan view of the support of a modified tool;

FIG. 14 is a plan view of the cutter which can be assembled with the support of FIG. 13;

FIG. 15 is a sectional view as seen in the direction of arrows from the line G-H of FIG. 14;

FIG. 16 is an elevational view of the support of a further material removing tool;

FIG. 17 is a plan view of the support which is shown in FIG. 16;

FIG. 18 is an elevational view of the cutter which can be assembled with the support of FIGS. 16 and 17;

FIG. 19 is a plan view of the cutter which is shown in FIG. 18;

FIG. 20 is a sectional view as seen in the direction of arrows from the line K-L of FIG. 19;

FIG. 21 is a schematic elevational view of a further material removing tool having two cutters at opposite sides of a common support; and FIG. 22 is a plan view of the tool which is shown in FIG. 21.

DESCRIPTION OF THE PREFERRED EMBODIMENTS

FIGS. 1 and 2 show a material removing tool which has a circular outline and includes a one-piece support 2 made of steel or another suitable metallic material, and a composite annular cutter 1 having three arcuate sections 5 with arcuate cutting edges 5a and three weakened portions or webs 6 which alternate with the sections 5 in the circumferential direction of the tool. The entire tool resembles a relatively flat disc, and the support 2 has a cylindrical centrally located projection or stud 3 received in a complementary central opening 4 of the cutter 1. The number of sections 5 can be increased to four or more without departing from the spirit of the invention.

As can be seen in FIG. 2, the cross-sectional area of each web 6 is less than the cross-sectional area of a section 5. This is accomplished by providing the outer side or surface of the cutter 1 (namely that side which faces away from the support 2) with three relatively shallow recesses 7 in the form of radially extending grooves or notches. The recesses 7 ensure that the material of the cutter 1 is weakened in the region of each of the webs 6 so that, when the underside (as seen in FIG. 2) of the cutter 1 is soldered to the adjacent surface of the support 2, the cutter cracks or breaks along one or more of its webs 6 so that each of the sections 5 can be said to constitute a discrete cutter. The thermal expansion coefficient of the material of the cutter 1 is sufficiently different from the thermal expansion coefficient of the material of the support 2 to ensure that at least one of the webs 6 will break in response to an increase of temperature such as is necessary to properly bond the cutter to the support in order to ensure that the sections 5 will properly adhere to the adjacent portions of the support when the resulting material removing tool is in actual use in a machine tool or the like. For example, the material of the cutter 1 can be tungsten carbide. Tungsten carbide is but one of a variety of materials which can be used to make the cutter 1.

FIG. 3 shows a modified material removing tool which is identical with the tool of FIGS. 1 and 2 except that the recesses 7 in the form of radially extending grooves or notches are provided in that side or surface of the cutter 1 which is bonded to the support 2.

FIG. 4 shows a further material removing tool which differs from the tools of FIGS. 1-2 and 3 in that its cutter 1 is provided with two sets of recesses 7 in the form of radially extending grooves, namely with a first set whose recesses register with the webs 6 and are provided in the outer or exposed side of the cutter 1 and a second set of recesses 7 in that side or surface which is adjacent and is bonded to the support 2. The materials of the cutters 1 and supports 2 are shown in FIGS. 3 and 4 and can be the same as the materials of the corresponding parts of the tool which is shown in FIGS. 1 and 2.

The breaks or cracks in the webs 6 are not specifically shown in the drawing. Such cracks develop automatically in response to bonding of the cutter 1 to the support 2 so that at least one of the several sections 5 of the cutter constitutes a separate part and eventual breaking or cracking of or other damage to a particular section 5 which is in the process of removing material from workpieces does not affect the integrity and quality of the remaining cutter section of sections 5. This ensures that the useful life of the improved tool is surprisingly long because, even if one of the sections 5 is destroyed or damaged in actual use, the other section or sections 5 remain intact and can be put to use by the simple expedient of changing the orientation of the support 2 relative to the holder in the machine in which the improved material removing tool is put to use. The support 2 constitutes a means for indirectly connecting the sections 5 to each other, even after the webs 6 develop cracks as a result of bonding of the cutter 1 to the support 2 and/or as a result of penetration of cutting edges 5a into workpieces. Conventional material removing tools are devoid of weakened portions corresponding to the webs 6 of the improved tool.

FIGS. 5 and 6 show a modified material removing tool wherein the support 2 and the annular cutter 1 have substantially triangular outlines. Each side of the triangular cutter 1 is provided with a transversely extending web 6, and such webs are formed by providing both sides of the cutter with recesses 7 in the form of grooves extending outwardly from the triangular projection 3 of the support 2 and registering with the respective webs 6. Each of the three sections 5 of the cutter 1 has a substantially V-shaped cutting edge 5a. The tool of FIGS. 5 and 6 can be modified by omitting the recesses 7 in the exposed surface or by omitting the recesses 7 in the other surface of the cutter 1.

FIGS. 7 and 8 show a material removing tool having a substantially square outline. The manner of forming the webs 6 is analogous to that shown in FIGS. 4 and 5-6, i.e., each web 6 is flanked by two recesses 7, one in that surface of the cutter 1 which is bonded to the support 2 and the other in the exposed surface of the cutter. The support 2 has a substantially cylindrical central projection 3 which extends into the complementary centrally located opening of the cutter 1. The manner in which one or more webs 6 develop cracks in response to bonding of the cutter 1 to the support 2 is the same as described above in connection with FIGS. 1 and 2. The cutter 1 of the finished tool has four discrete substantially square sections 5 each of which has a substantially V-shaped cutting edge 5a.

FIG. 9 shows a further material removing tool which can be used with advantage in so-called peeling or shaving machines. The tool has a substantially hexagonal outline with a support having a substantially triangular centrally located projection 3 received in a complementary opening of the cutter 1. The cutter 1 has three discrete sections 5 with substantially V-shaped cutting edges 5a. The neighboring sections 5 are connected to each other by discrete radially extending webs 6 each in register with at least one radially extending recess or groove of the cutter. The integrity of one or more webs 6 is destroyed in response to bonding of the cutter 1 to the support. The cutter 1 of FIG. 9 can be used in a milling, shaving, peeling or any other suitable machine and can be put to extended use because eventual damage to one of the sections 5 does not influence the integrity of the other two sections.

FIG. 10 shows a further material removing tool which has an annular cutter 1 mounted on a support having a centrally located projection 3 received in a complementary opening of the cutter. The cutter 1 has two mirror symmetrical halves which are separated from each other by cracks in the corresponding webs 6. Each of the sections 5 has a substantially U-shaped cutting edge 5a. The tool of FIG. 10 is inexpensive. It is clear that the configuration of this tool can be changed without departing from the spirit of the invention. For example, this tool (as well as the tool of FIG. 9) can have an octagonal or any other desired and practical polygonal outline.

FIGS. 11 and 12 show a material removing tool which is similar to the tool of FIG. 9 except that the thickness of the marginal portion of the support 2 as well as of the cutter 1 varies in the circumferential direction of the assembled tool. As can be seen in FIG. 11, the thickness of the sections 5 increases from the respective webs 6 toward the center of the respective cutting edge 5a. Since the underside of the cutter 1 is complementary to the upper side of the support 2, the thickness of the marginal portion of the support is greater where the thickness of the cutter is reduced and vice versa. The feature that the thickness of the sections 5 increases in directions away from the respective webs 6 contributes to the stability of the cutters and to longer useful life of the entire tool. In other words, larger concentrations of material of the cutter are disposed in the regions of the cutting edges 5a.

FIG. 13 is a plan view of a support 2 of the type shown in FIGS. 9 and 11. The corresponding cutter 1 is shown in FIGS. 14 and 15. As can be seen in FIG. 15, the cross-section of the cutter 1 in the region of the central portion of each of its sections 5 can have a rectangular outline.

FIGS. 16 and 17 show a support 2 which has an outline similar to that of the support of FIGS. 9, 11 and 13. The upper side or surface 10 of the support slopes outwardly and downwardly in a direction radially of and away from the centrally located projection 3. This is analogous to the construction which is shown in FIGS. 11 and 12. The corresponding cutter 1 is shown in FIGS. 18, 19 and 20. As can be seen in FIG. 20, the cross-section of a section 5 of the cutter 1 of FIGS. 8 and 19 can deviate from a rectangular outline. The reference character 9 denotes that side or surface of the cutter which abuts the surface 10 of the support 2 in the assembled tool.

An advantage of the structure which is shown in FIGS. 16 to 20 is that the cutter 1 is automatically centered when its opening receives the projection 3 of the support 2. This ensures proper bonding of the surface 10 of the support 2 to the adjacent surface 9 of the cutter 1. Soldering of the cutter 1 to the support 2 can take place in a suitable oven of any known design. The configurations of the support 2 and cutter 1 which are shown in FIGS. 16 to 20 ensure that there is no need for the provision of specially designed fixing means to hold the cutter in a proper position relative to the support during bonding.

FIGS. 21 and 22 show a further material removing tool which differs from the tool of FIG. 11 in that the support 2 is disposed between two mirror symmetrical cutters 1 each of which can be configured in a manner as shown in FIG. 12. Thus, each cutter has a first or inner side or surface which is bonded to the respective side or surface of the support 2, and a second or exposed surface. The recesses 7 can be provided in the exposed surfaces of the cutters 1. It goes without saying that the tool of FIGS. 21 and 22 need not necessarily have a substantially hexagonal outline. Thus, it is equally possible to impart to such composite tool a triangular, circular, oval or any other suitable shape, depending on the requirements in the particular machine tool.

An important advantage of all embodiments of the improved machine tool is that the tool can stand long periods of use because the integrity of one of the sections 5 is not dependent upon the integrity or lack of integrity of the other section or sections. It is presently preferred to provide the cutter with at least three cutting edges. The useful life of the tool can be prolonged by providing it with two cutters, one at each side of a common support.

The web or webs which do not exhibit cracks as a result of bonding will or can develop cracks when one of the adjacent cutting edges is put to use.

The material which can be used to make the cutter 1 is not limited to tungsten carbide, also high speed steel or ceramic material can be used.

The webs 6 define predetermined breaking points. The invention is not limited to the webs 6 described with reference to the accompanying drawing, i.e., the cross-sectional areas of the webs 6 may be smaller in any direction to ensure that the webs 6 ultimately exhibit cracks.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A material removing tool comprising a support consisting of a metallic material having a first thermal expansion coefficient; and a composite cutter consisting of a harder second material having a different second thermal expansion coefficient and being bondable to the metallic material, said cutter including a plurality of neighboring sections each having a cutting edge and webs disposed between said sections, the cross-sectional areas of said webs being smaller than the cross-sectional areas of said sections and said cutter being bonded to said support as a result of the application of heat at temperatures such that at least one of said webs exhibits cracks due to the difference between the thermal expansion coefficients of the materials of said support and said cutter and the difference between the cross-sectional areas of said sections and said webs.

2. The tool of claim 1, wherein said cutter is an annulus and said support has a projection which is surrounded by said annulus.

3. The tool of claim 2, wherein said support has a relatively thin portion adjacent each of said cutting edges and each of said sections has a relatively thick portion in the region of the respective cutting edge.

4. The tool of claim 2, wherein the thickness of said support decreases in a direction radially outwardly from said projection and said support and said cutter have abutting surfaces which are bonded to each other.

5. The tool of claim 2, wherein said cutter has recesses in register with said webs.

6. The tool of claim 5, wherein said cutter has a surface adjacent said support and said recesses are provided in said surface.

7. The tool of claim 5, wherein said cutter has a first surface adjacent said support and a second surface facing away from said support, said recesses being provided in at least one of said surfaces.

8. The tool of claim 5, wherein said cutter has a surface facing away from said support and said recesses are provided in said surface.

9. The tool of claim 2, wherein said cutter has a substantially circular shape.

10. The tool of claim 2, wherein said cutter has a polygonal shape.

11. The tool of claim 10, wherein said cutter has a substantially triangular shape.

12. The tool of claim 10, wherein said cutter has a substantially square shape.

13. The tool of claim 10, wherein said cutter has a substantially hexagonal shape.

14. The tool of claim 10, wherein said cutter has a substantially octagonal shape.

15. The tool of claim 1, wherein said support has a first side and a second side opposite said first side, said cutter being adjacent one of said sides and further comprising a second cutter adjacent the other of said sides.

16. A method of assembling a material removing tool, comprising the steps of forming a support consisting of a first material having a first thermal expansion coefficient; forming a cutter consisting of a harder second material having a different second thermal expansion coefficient and being bondable to the first material; providing the cutter with a plurality of cutting edges and with weakened portions intermediate the cutting edges; and bonding the cutter to the support with the application of heat at a temperature such that the integrity of at least one of the weakened portions is destroyed due to the difference between the thermal expansion coefficients of the materials of the support and the cutter.

17. The method of claim 16, wherein said bonding step includes soldering the cutter to the support.

18. The method of claim 16, further comprising the steps of providing the cutter with a centrally located opening and providing the support with a projection in the opening.

19. The method of claim 16, wherein the first material is steel.

20. The method of claim 16, wherein each weakened zone is formed by reducing the cross-sectional area of the cutter between its cutting edges.

* * * * *